United States Patent
Goodchild et al.

(10) Patent No.: US 11,837,882 B2
(45) Date of Patent: Dec. 5, 2023

(54) AMPLITUDE SHIFT KEY MODULATION FOR MULTI-DEVICE WIRELESS CHARGERS

(71) Applicant: AIRA, INC., Chandler, AZ (US)

(72) Inventors: Eric Heindel Goodchild, Phoenix, AZ (US); John Winters, Chandler, AZ (US)

(73) Assignee: Aira, Inc., Phoenix, AZ (US)

( * ) Notice: Subject to any disclaimer, the term of this patent is extended or adjusted under 35 U.S.C. 154(b) by 408 days.

(21) Appl. No.: 17/140,977

(22) Filed: Jan. 4, 2021

(65) Prior Publication Data

US 2021/0210989 A1 Jul. 8, 2021

Related U.S. Application Data

(60) Provisional application No. 62/957,436, filed on Jan. 6, 2020.

(51) Int. Cl.
*H02J 7/00* (2006.01)
*H02J 50/40* (2016.01)
*H02J 50/80* (2016.01)
*H02J 50/12* (2016.01)

(52) U.S. Cl.
CPC ............ *H02J 50/402* (2020.01); *H02J 50/12* (2016.02); *H02J 50/80* (2016.02)

(58) Field of Classification Search
USPC .................... 320/106, 107, 108, 109, 110
See application file for complete search history.

(56) References Cited

U.S. PATENT DOCUMENTS

| | | | |
|---|---|---|---|
| 3,575,665 | A | 4/1971 | Honma |
| 2013/0130621 | A1 | 5/2013 | Kim et al. |
| 2015/0008756 | A1 | 1/2015 | Lee et al. |
| 2016/0336785 | A1 | 11/2016 | Gao et al. |
| 2018/0219431 | A1* | 8/2018 | Guillermo ............... H02J 50/12 |

(Continued)

OTHER PUBLICATIONS

PCT/US2021/012200. International Search Report & Written Opinion (dated Mar. 23, 2021) pp. 12.

(Continued)

*Primary Examiner* — Brian Ngo
(74) *Attorney, Agent, or Firm* — Anthony Smyth; LOZA & LOZA, LLP

(57) ABSTRACT

Systems, methods and apparatus for wireless charging are disclosed. One method includes providing a first charging current to a first transmitting coil in a wireless charging device, where the first transmitting coil is coupled to a receiving coil in a first power receiving device, providing a second charging current to a second transmitting coil in the wireless charging device, where the second transmitting coil is coupled to a receiving coil in a second power receiving device, the first charging current and the second charging current being provided at different frequencies from one another, receiving a first modulated signal from the first power receiving device, where the first modulated signal includes a carrier signal provided at a frequency corresponding to the frequency of the first charging current, and filtering the first modulated signal using a band-pass filter configured to block a second modulated signal transmitted by the second power receiving device.

20 Claims, 16 Drawing Sheets

(56) References Cited

U.S. PATENT DOCUMENTS

| | | | |
|---|---|---|---|
| 2019/0267828 A1 | 8/2019 | Goodchild et al. | |
| 2020/0076474 A1* | 3/2020 | Daga | H04B 5/0037 |
| 2020/0227932 A1* | 7/2020 | Kim | H02J 50/80 |
| 2021/0167631 A1* | 6/2021 | Sato | H02J 7/02 |
| 2021/0210989 A1* | 7/2021 | Goodchild | H02J 50/12 |

OTHER PUBLICATIONS

Corresponding CN Application No. 202180018977.4. Office Action (dated Jul. 19, 2023).

* cited by examiner

AMPLITUDE SHIFT KEY MODULATION FOR MULTI-DEVICE WIRELESS CHARGERS

PRIORITY CLAIM

This application claims priority to and the benefit of provisional patent application No. 62/957,436 filed in the United States Patent Office on Jan. 6, 2020, the entire content of this application being incorporated herein by reference as if fully set forth below in their entirety and for all applicable purposes.

TECHNICAL FIELD

The present invention relates generally to wireless charging of batteries, and more particularly to communicating concurrently with multiple devices that are being charged on a surface of a multi-coil wireless charging device.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Conventional wireless charging systems typically use a "Ping" to determine if a receiving device is present on or proximate to a transmitting coil in a base station for wireless charging. The transmitter coil has an inductance (L) and, a resonant capacitor that has a capacitance (C) is coupled to the transmitting coil to obtain a resonant LC circuit. A Ping is produced by delivering power to the resonant LC circuit. Power is applied for a duration of time (90 ms in one example) while the transmitter listens for a response from a receiving device. The response may be provided in a signal encoded using Amplitude Shift Key (ASK) modulation. In one example, a typical transmitting base station may ping as fast as 12.5 times a second (period=1/80 ms) with a power consumption of (80 mJ*12.5) per second=1 W.

Improvements in wireless charging capabilities are required to support continually increasing complexity of mobile devices and changing form factors. For example, there is a need for improved control of charging procedures in multi-coil, multi-device charging pads.

DETAILED DESCRIPTION

Figure 1:
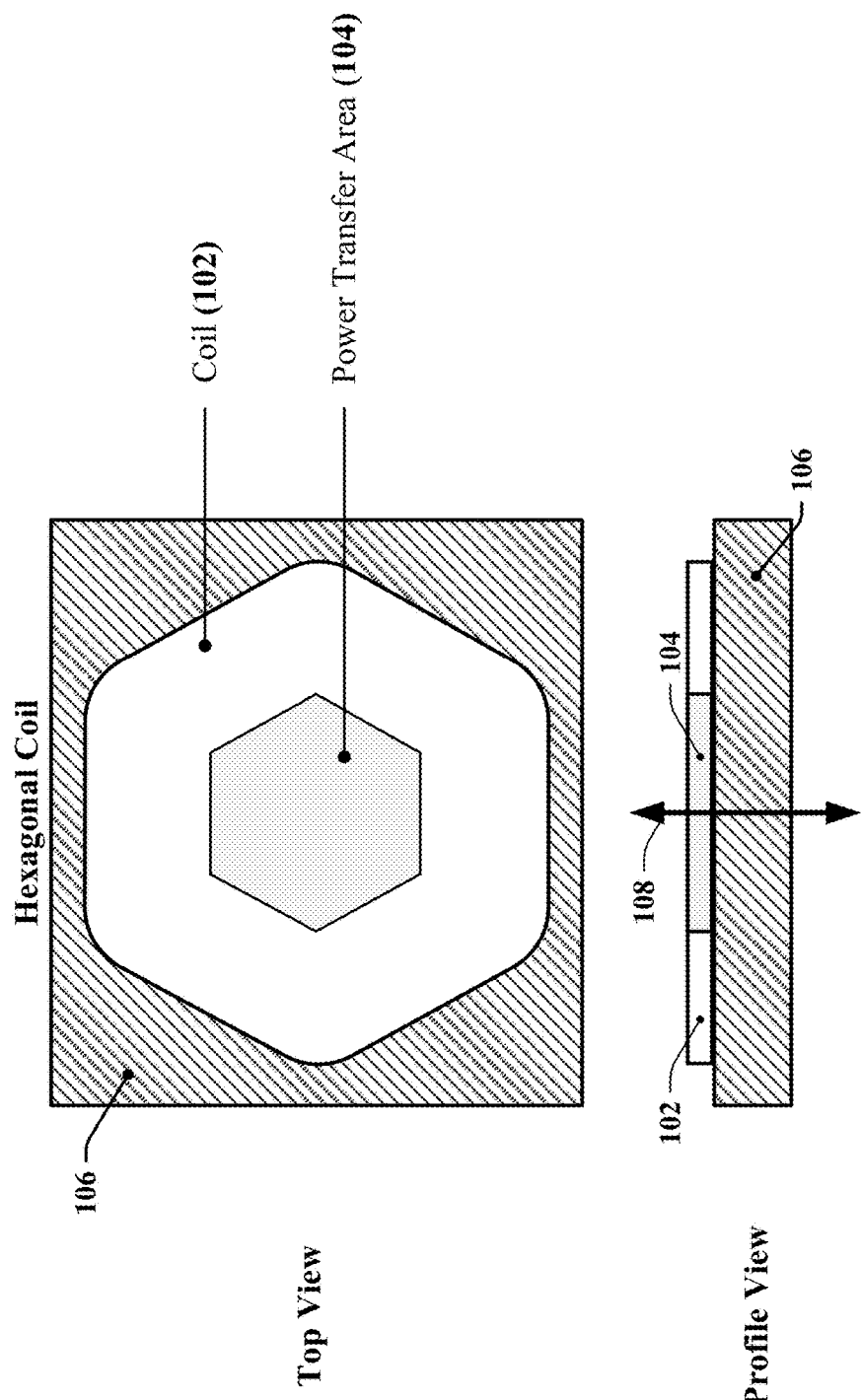
FIG. 1 illustrates an example of a charging cell that may be employed to provide a charging surface in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices that provide a free-positioning charging surface that has multiple transmitting coils or that can concurrently charge multiple receiving devices. In one aspect, a controller in the wireless charging device can locate a device to be charged and can configure one or more transmitting coils optimally positioned to deliver power to the receiving device. Charging cells may be provisioned or configured with one or more inductive transmitting coils and multiple charging cells may be arranged or configured to provide the charging surface. The location of a device to be charged may be detected through sensing techniques that associate location of the device to changes in a physical characteristic centered at a known location on the charging surface. In some examples, sensing of location may be implemented using capacitive, resistive, inductive, touch, pressure, load, strain, and/or another appropriate type of sensing.

Certain aspects disclosed herein relate to improved wireless charging techniques. Systems, apparatus and methods are disclosed that accommodate free placement of chargeable devices on a surface of a multi-coil wireless charging device. Certain aspects can improve the efficiency and capacity of wireless power transmission to a receiving device. In one example, a wireless charging apparatus has a battery charging power source, a plurality of charging cells configured in a matrix, a first plurality of switches in which each switch is configured to couple a row of coils in the matrix to a first terminal of the battery charging power source, and a second plurality of switches in which each switch is configured to couple a column of coils in the matrix to a second terminal of the battery charging power source. Each charging cell in the plurality of charging cells may include one or more coils surrounding a power transfer area. The plurality of charging cells may be arranged adjacent to a charging surface without overlap of power transfer areas of the charging cells in the plurality of charging cells.

According to certain aspects disclosed herein, power can be wirelessly transferred to a receiving device located anywhere on a charging surface that can have an arbitrarily defined size or shape without regard to any discrete placement locations enabled for charging. Multiple devices can be simultaneously charged on a single charging surface. The charging surface may be manufactured using printed circuit board technology, at low cost and/or with a compact design.

Charging Cells

Certain aspects of the present disclosure relate to systems, apparatus and methods applicable to wireless charging devices that provide a free-positioning charging surface that has multiple transmitting coils or that can concurrently charge multiple receiving devices. In one aspect, a controller in the wireless charging device can locate a device to be charged and can configure one or more transmitting coils optimally positioned to deliver power to the receiving device. Charging cells may be provisioned or configured with one or more inductive transmitting coils and multiple charging cells may be arranged or configured to provide the charging surface. The location of a device to be charged may be detected through sensing techniques that associate location of the device to changes in a physical characteristic centered at a known location on the charging surface. In some examples, sensing of location may be implemented using capacitive, resistive.

According to certain aspects disclosed herein, a charging surface in a wireless charging device may be provided using charging cells that are deployed adjacent to the charging surface. In one example the charging cells are deployed in accordance with a honeycomb packaging configuration. A charging cell may be implemented using one or more coils that can each induce a magnetic field along an axis that is substantially orthogonal to the charging surface adjacent to the coil. In this disclosure, a charging cell may refer to an element having one or more coils where each coil is configured to produce an electromagnetic field that is additive with respect to the fields produced by other coils in the charging cell and directed along or proximate to a common axis. In this description, a coil in a charging cell may be referred to as a charging coil or a transmitting coil.

In some examples, a charging cell includes coils that are stacked along a common axis. One or more coils may overlap such that they contribute to an induced magnetic field substantially orthogonal to the charging surface. In some examples, a charging cell includes coils that are arranged within a defined portion of the charging surface and that contribute to an induced magnetic field within the defined portion of the charging surface, the magnetic field contributing to a magnetic flux flowing substantially orthogonal to the charging surface. In some implementations, charging cells may be configurable by providing an activating current to coils that are included in a dynamically-defined charging cell. For example, a wireless charging device may include multiple stacks of coils deployed across a charging surface, and the wireless charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils.

FIG. 1 illustrates an example of a charging cell 100 that may be deployed and/or configured to provide a charging surface in a wireless charging device. In this example, the charging cell 100 has a substantially hexagonal shape that encloses one or more coils 102 constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations may include or use coils 102 that have other shapes. The shape of the coils 102 may be determined at least in part by the capabilities or limitations of fabrication technology or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
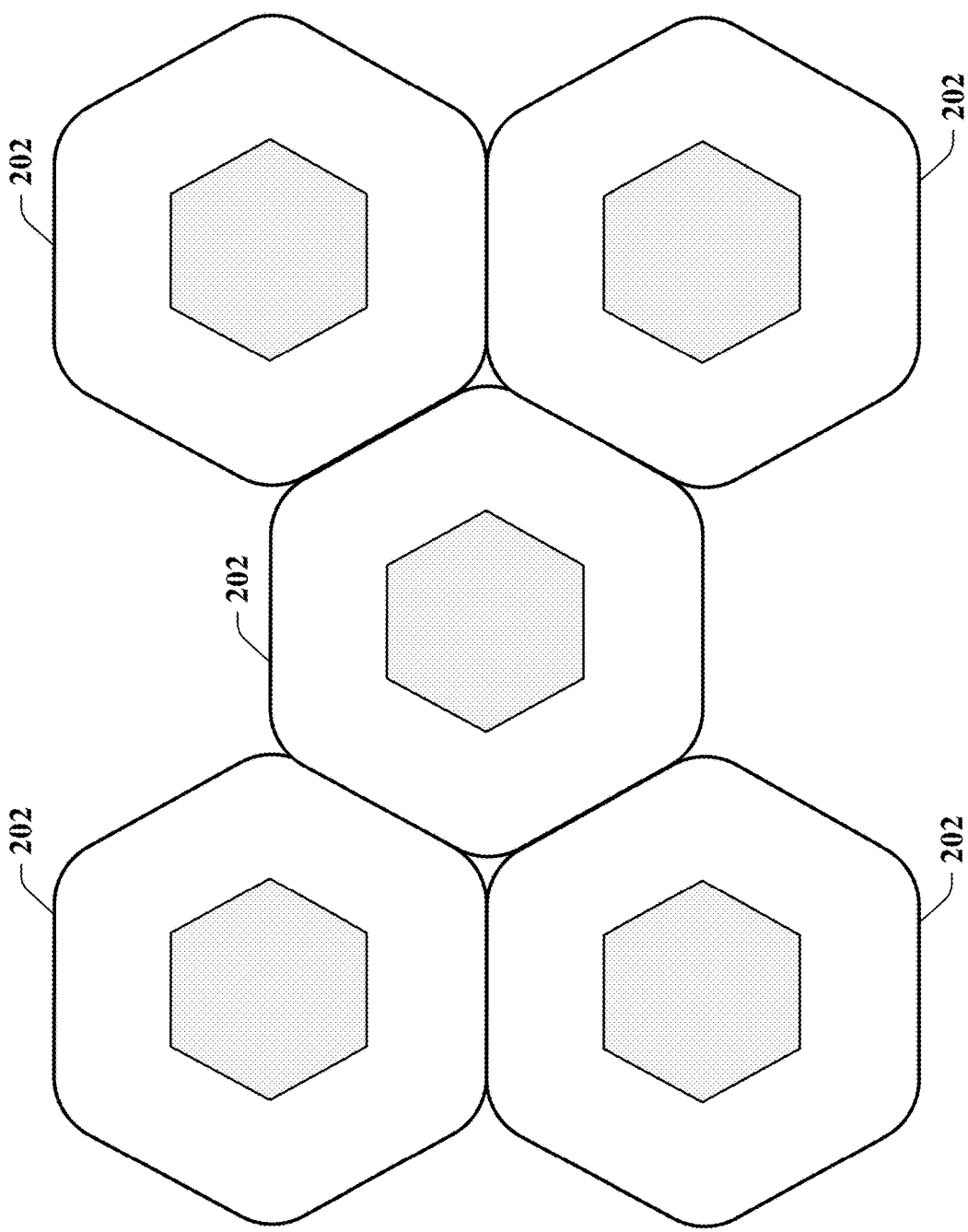
FIG. 2 illustrates an example of an arrangement of charging cells provided on a single layer of a segment of a charging surface that may be adapted in accordance with certain aspects disclosed herein.

FIG. 2 illustrates an example of an arrangement 200 of charging cells 202 provided on a single layer of a segment or portion of a charging surface that may be adapted in accordance with certain aspects disclosed herein. The charging cells 202 are arranged according to a honeycomb packaging configuration. In this example, the charging cells 202 are arranged end-to-end without overlap. This arrangement can be provided without through-holes or wire interconnects. Other arrangements are possible, including arrangements in which some portion of the charging cells 202 overlap. For example, wires of two or more coils may be interleaved to some extent.

Figure 3:
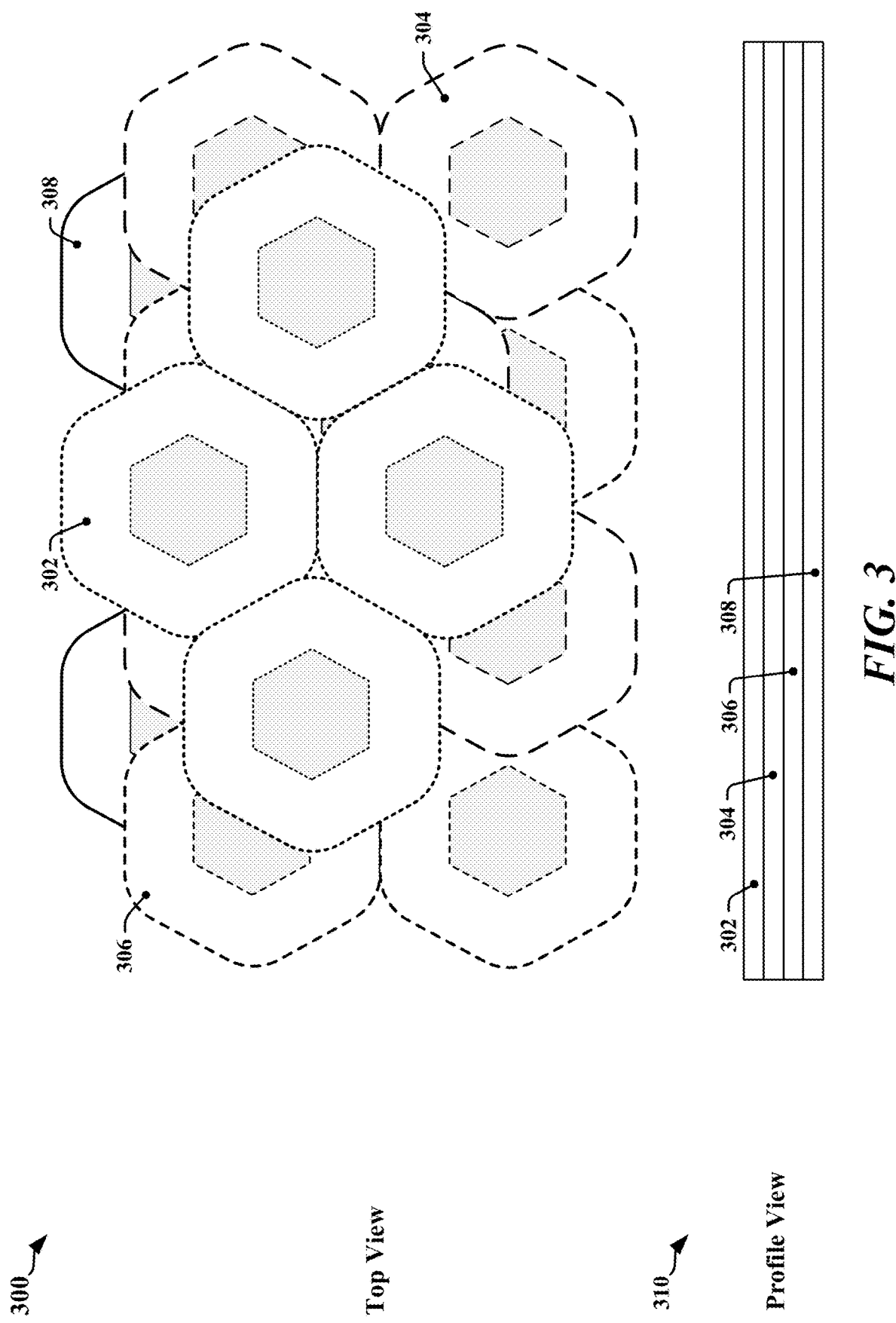
FIG. 3 illustrates an example of an arrangement of charging cells when multiple layers are overlaid within a segment of a charging surface that may be adapted in accordance with certain aspects disclosed herein.

FIG. 3 illustrates an example of an arrangement of charging cells from two perspectives 300, 310 when multiple layers are overlaid within a segment or portion of a charging surface that may be adapted in accordance with certain aspects disclosed herein. Layers of charging cells 302, 304, 306, 308 are provided within the charging surface. The charging cells within each layer of charging cells 302, 304, 306, 308 are arranged according to a honeycomb packaging configuration. In one example, the layers of charging cells 302, 304, 306, 308 may be formed on a printed circuit board that has four or more layers. The arrangement of charging cells 100 can be selected to provide complete coverage of a designated charging area that is adjacent to the illustrated segment.

Figure 4:
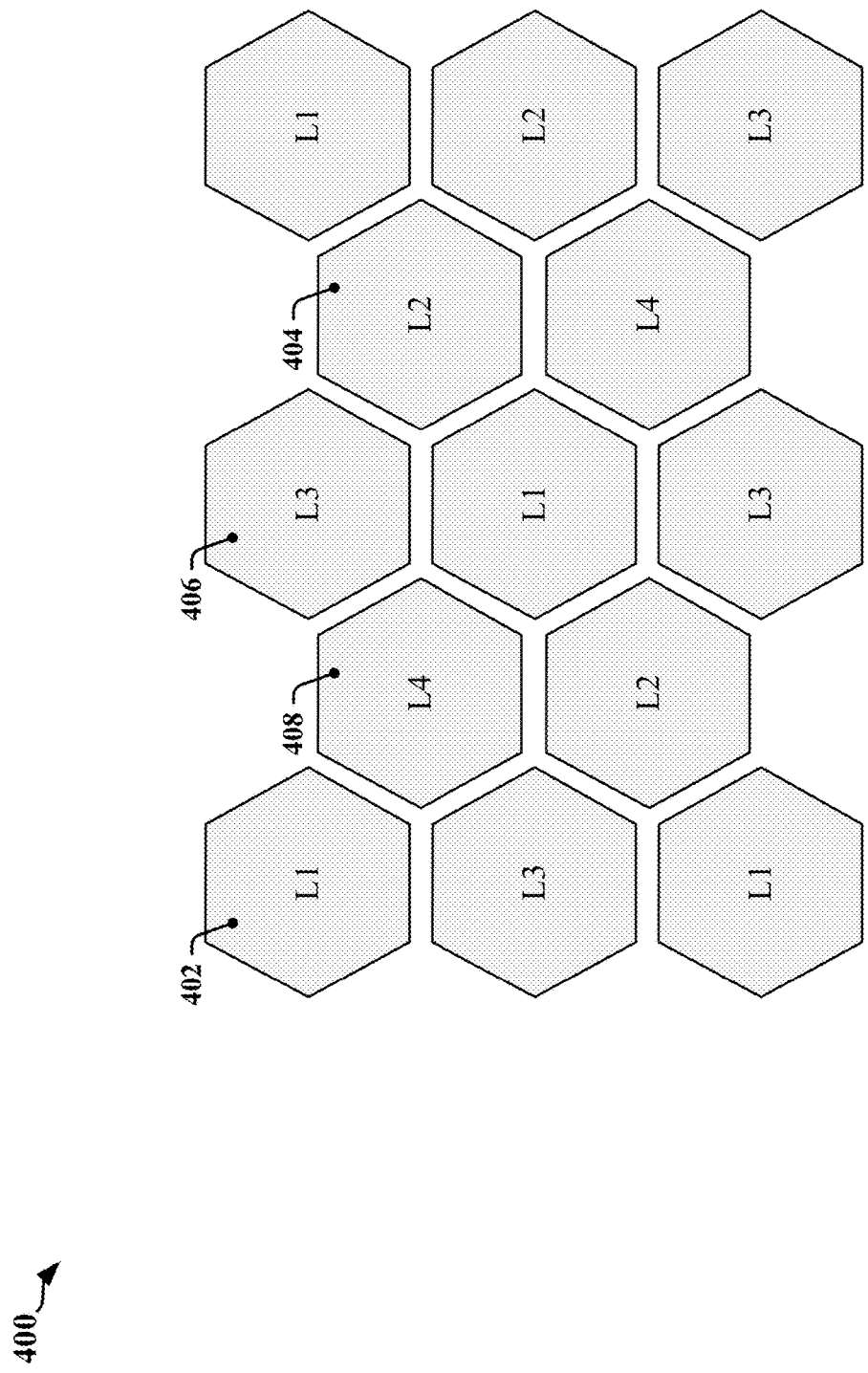
FIG. 4 illustrates the arrangement of power transfer areas provided by a charging surface that employs multiple layers of charging cells configured in accordance with certain aspects disclosed herein.

FIG. 4 illustrates the arrangement of power transfer areas provided in a charging surface 400 that employs multiple layers of charging cells configured in accordance with certain aspects disclosed herein. The illustrated charging surface is constructed from four layers of charging cells 402, 404, 406, 408. In FIG. 4, each power transfer area provided by a charging cell in the first layer of charging cells 402 is marked "L1", each power transfer area provided by a charging cell in the second layer of charging cells 404 is marked "L2", each power transfer area provided by a charging cell in the third layer of charging cells 406 is marked "L3", and each power transfer area provided by a charging cell in the fourth layer of charging cells 408 is marked "L4".

Figure 5:
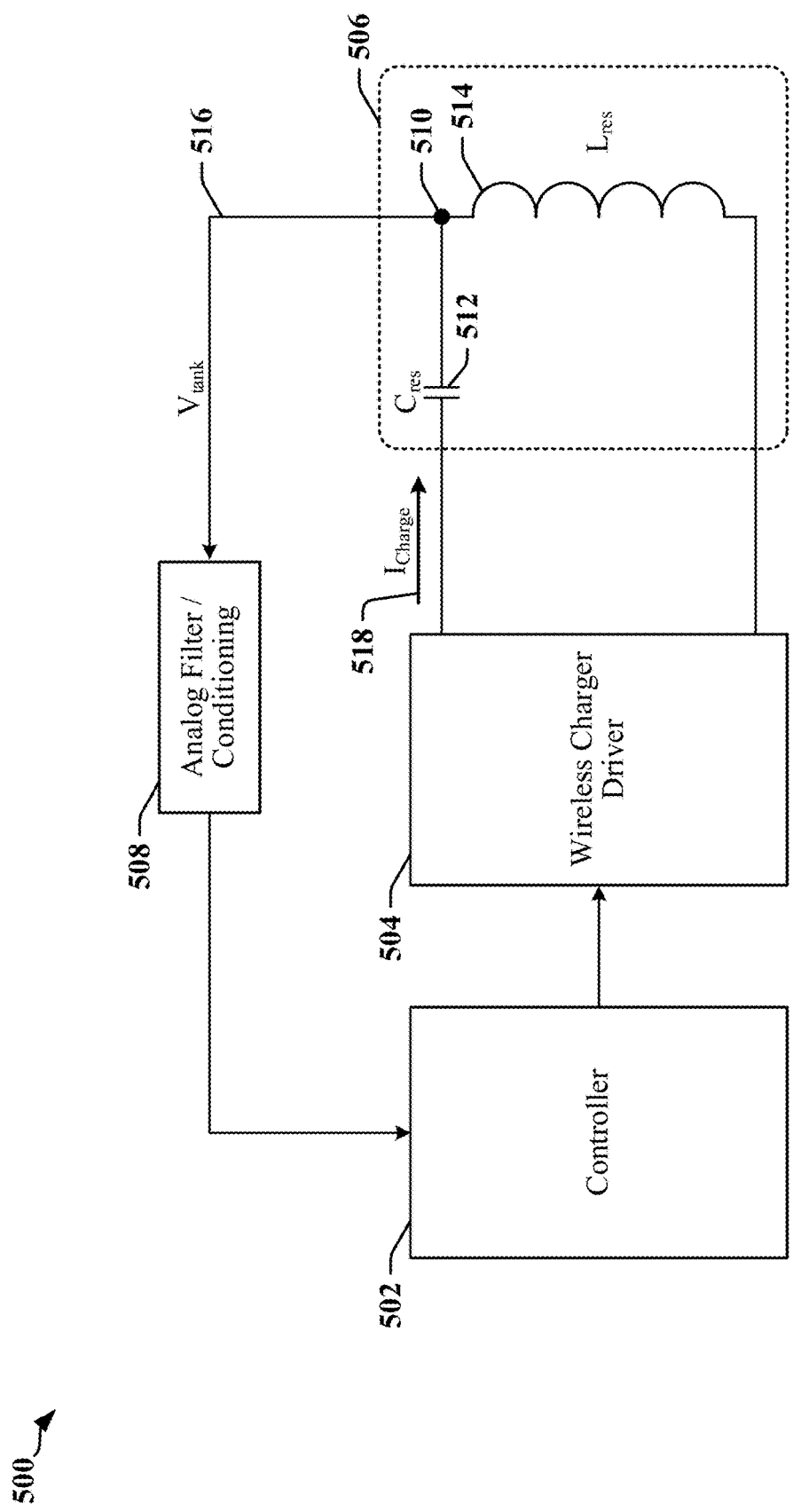
FIG. 5 illustrates a wireless transmitter that may be provided in a charger base station in accordance with certain aspects disclosed herein.

FIG. 5 illustrates an example of a wireless transmitter 500 that can be provided in a base station of a wireless charging device. A base station in a wireless charging device may include one or more processing circuits used to control operations of the wireless charging device. A controller 502 may receive a feedback signal filtered or otherwise processed by a filter circuit 508. The controller may control the operation of a driver circuit 504 that provides an alternating current to a resonant circuit 506. In some examples, the controller 502 may generate a digital frequency reference signal used to control the frequency of the alternating current output by the driver circuit 504. In some instances, the digital frequency reference signal may be generated using a programmable counter or the like. In some examples, the driver circuit 504 includes a power inverter circuit and one or more power amplifiers that cooperate to generate the alternating current from a direct current source or input. In some examples, the digital frequency reference signal may be generated by the driver circuit 504 or by another circuit. The resonant circuit 506 includes a capacitor 512 and inductor 514. The inductor 514 may represent or include one or more transmitting coils in a charging cell that produced a magnetic flux responsive to the alternating current. The resonant circuit 506 may also be referred to herein as a tank circuit, LC tank circuit, or LC tank, and the voltage 516 measured at an LC node 510 of the resonant circuit 506 may be referred to as the tank voltage.

Passive ping techniques may use the voltage and/or current measured or observed at the LC node 510 to identify the presence of a receiving coil in proximity to the charging pad of a device adapted in accordance with certain aspects disclosed herein. Some conventional wireless charging devices include circuits that measure voltage at the LC node 510 of the resonant circuit 506 or the current in the resonant circuit 506. These voltages and currents may be monitored for power regulation purposes and/or to support communication between devices. According to certain aspects of this disclosure, voltage at the LC node 510 in the wireless transmitter 500 illustrated in FIG. 5 may be monitored to support passive ping techniques that can detect presence of a chargeable device or other object based on response of the resonant circuit 506 to a short burst of energy (the ping) transmitted through the resonant circuit 506.

A passive ping discovery technique may be used to provide fast, low-power discovery. A passive ping may be produced by driving a network that includes the resonant circuit 506 with a fast pulse that includes a small amount of energy. The fast pulse excites the resonant circuit 506 and causes the network to oscillate at its natural resonant frequency until the injected energy decays and is dissipated. The response of a resonant circuit 506 to a fast pulse may be determined in part by the resonant frequency of the resonant LC circuit. A response of the resonant circuit 506 to a passive ping that has initial voltage=$V_0$ may be represented by the voltage $V_{LC}$ observed at the LC node 510, such that:

$$V_{LC} = V_0 e^{-\left(\frac{\omega}{2Q}\right)t} \quad \text{(Eq. 1)}$$

The resonant circuit 506 may be monitored when the controller 502 or another processor is using digital pings to detect presence of objects. A digital ping is produced by driving the resonant circuit 506 for a period of time. The resonant circuit 506 is a tuned network that includes a transmitting coil of the wireless charging device. A receiving device may modulate the voltage or current observed in the resonant circuit 506 by modifying the impedance presented by its power receiving circuit in accordance with signaling state of a modulating signal. The controller 502 or other processor then waits for a data modulated response that indicates that a receiving device is nearby.

Selectively Activating Coils

According to certain aspects disclosed herein, coils in one or more charging cells may be selectively activated to provide an optimal electromagnetic field for charging a compatible device. In some instances, coils may be assigned to charging cells, and some charging cells may overlap other charging cells. The optimal charging configuration may be selected at the charging cell level. In some examples, a charging configuration may include charging cells in a charging surface that are determined to be aligned with or located close to the device to be charged. A controller may activate a single coil or a combination of coils based on the charging configuration which in turn is based on detection of location of the device to be charged. In some implementations, a wireless charging device may have a driver circuit that can selectively activate one or more transmitting coils or one or more predefined charging cells during a charging event.

Figure 6:
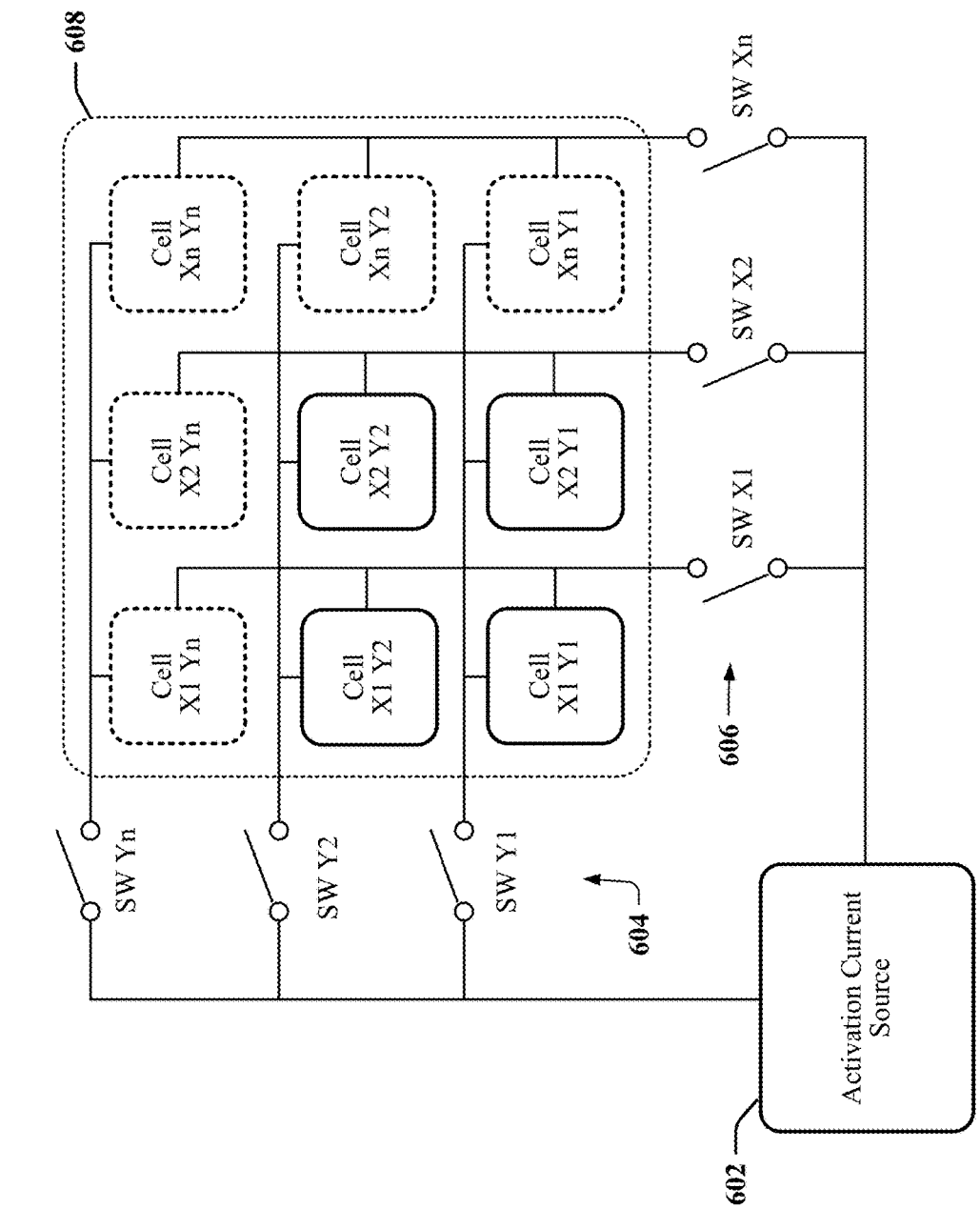
FIG. 6 illustrates a first topology that supports matrix multiplexed switching for use in a wireless charging device adapted in accordance with certain aspects disclosed herein.

FIG. 6 illustrates a first topology 600 that supports matrix multiplexed switching for use in a wireless charging device adapted in accordance with certain aspects disclosed herein. The wireless charging device may select one or more charging cells 100 to charge a receiving device. Charging cells 100 that are not in use can be disconnected from current flow. A relatively large number of charging cells 100 may be used in the honeycomb packaging configuration illustrated in FIGS. 2 and 3, requiring a corresponding number of switches. According to certain aspects disclosed herein, the charging cells 100 may be logically arranged in a matrix 608 having multiple cells connected to two or more switches that enable specific cells to be powered. In the illustrated topology 600, a two-dimensional matrix 608 is provided, where the dimensions may be represented by X and Y coordinates. Each of a first set of switches 606 is configured to selectively couple a first terminal of each cell in a column of cells to a first terminal of a voltage or current source 602 that provides current to activate coils in one or more charging cells during wireless charging. Each of a second set of switches 604 is configured to selectively couple a second terminal of each cell in a row of cells to a second terminal of the voltage or current source 602. A charging cell is active when both terminals of the cell are coupled to the voltage or current source 602.

The use of a matrix 608 can significantly reduce the number of switching components needed to operate a network of tuned LC circuits. For example, N individually connected cells require at least N switches, whereas a two-dimensional matrix 608 having N cells can be operated with √N switches. The use of a matrix 608 can produce significant cost savings and reduce circuit and/or layout complexity. In one example, a 9-cell implementation can be implemented in a 3×3 matrix 608 using 6 switches, saving 3 switches. In another example, a 16-cell implementation can be implemented in a 4×4 matrix 608 using 8 switches, saving 8 switches.

During operation, at least 2 switches are closed to actively couple one coil or charging cell to the voltage or current source 602. Multiple switches can be closed at once in order to facilitate connection of multiple coils or charging cells to the voltage or current source 602. Multiple switches may be closed, for example, to enable modes of operation that drive multiple transmitting coils when transferring power to a receiving device.

Figure 7:
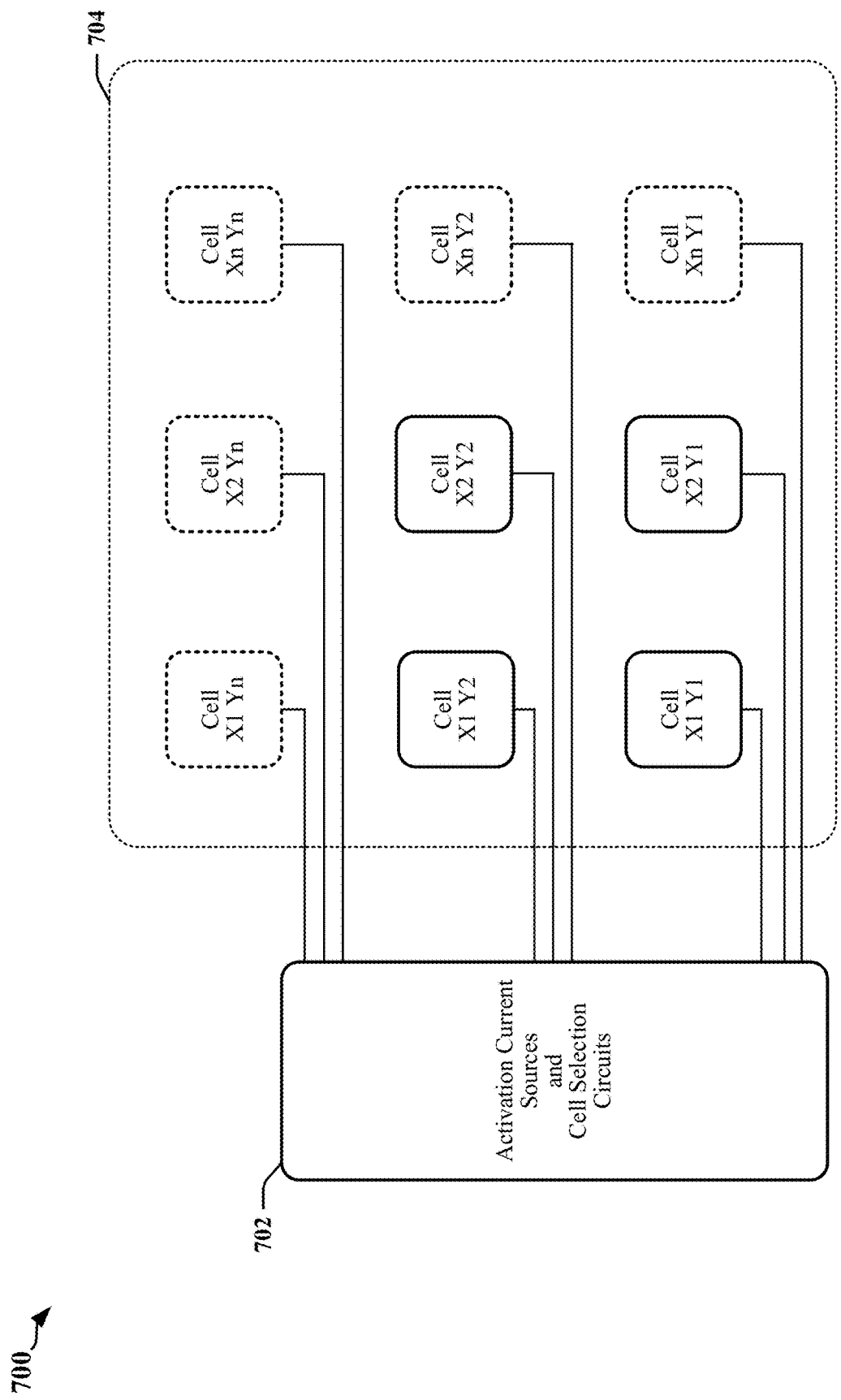
FIG. 7 illustrates a second topology that supports direct current drive in a wireless charging device adapted in accordance with certain aspects disclosed herein.

FIG. 7 illustrates a second topology 700 in which each coil or charging cell is individually and/or directly driven by a driver circuit 702 in accordance with certain aspects disclosed herein. The driver circuit 702 may be configured to select one or more coils or charging cells 100 from a group of coils 704 to charge a receiving device. It will be appreciated that the concepts disclosed here in relation to charging cells 100 may be applied to selective activation of individual coils or stacks of coils. Charging cells 100 that are not in use receive no current flow. A relatively large number of charging cells 100 may be in use and a switching matrix may be employed to drive individual coils or groups of coils. In one example, a first switching matrix may configure connections that define a charging cell or group of coils to be used during a charging event and a second switching matrix may be used to activate the charging cell and/or group of selected coils. The availability of direct drive to one or more coils may permit the wireless charging device to concurrently transmit a ping through different groupings of coils.

Control Messaging During Charging Procedures

Certain aspects of the disclosure relate to wireless communication of configuration, control, status and other information between a power transmitter and a power receiver that is being wirelessly charged through the power transmitter. The configuration, control, status and other information may be communicated before and during power transmission in messages encoded in accordance with standards-defined protocols. In one example, Qi protocols enable the power receiver to transmit requests to the power transmitter and to wirelessly exercise some control over the power transmitter. Qi protocols are implemented in many wireless charging devices to manage the wireless interconnection between a power transmitter to a power receiver. Qi protocols provide for the exchange of messages from power receiver to power transmitter by way of Amplitude Shift Keying (ASK) modulation that produces an ASK signal carried in the electromagnetic flux between the power transmitter and power receiver.

Figure 8:
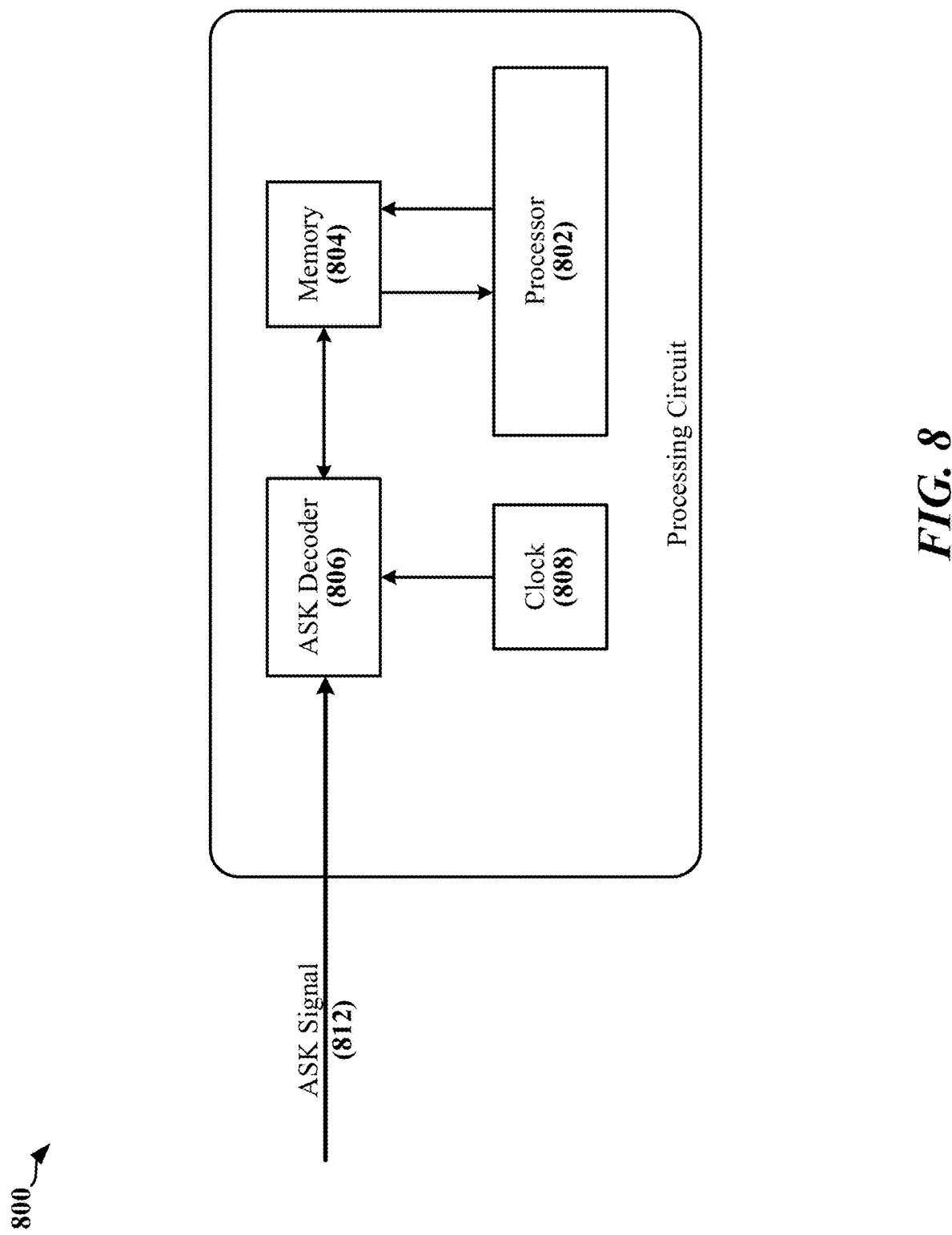
FIG. 8 illustrates a microcontroller that supports ASK demodulation in accordance with certain aspects disclosed herein.

FIG. 8 illustrates an example of a processing circuit 800 that may be configured to receive and decode ASK-modulated signal. The processing circuit 800 includes a processor 802 which may be coupled to a memory device 804, registers or other types of storage operable to store messages to be transmitted using an ASK-modulated signal 812 and/or messages decoded from a received ASK-modulated signal 812. The processing circuit 800 includes an ASK decoder 806 that may be implemented using hardware, software or some combination of hardware and software. The ASK decoder 806 may use a clock signal received from a clock generation or recovery circuit to control timing of the transmitted ASK-modulated signal 812 and to control sampling and decoding of a received ASK-modulated signal 812.

In some examples, a digital signal processor (DSP) may be employed to decode the ASK-modulated signal 812 that modulates voltage or current in the tank circuit of an inductive power transfer device. In the wireless transmitter 500 of FIG. 5, the ASK-modulated signal 812 may represent or be derived from the charging current 518 or the voltage 516 measured at an LC node 510 of the resonant circuit 506. In many examples, interrupts can be used to determine or measure timing between level changes on the ASK-modulated signal 812. In one example, a demodulation circuit may cooperate with a timer provided by a microcontroller (MCU) to generate interrupts used to calculate time between edges. A sequence of time measurements may be used to decode the ASK-modulated signal 812. In another example, a DSP or digital signal controller may be used to demodulate the ASK-modulated signal using digital signal processing methods.

Figure 9:
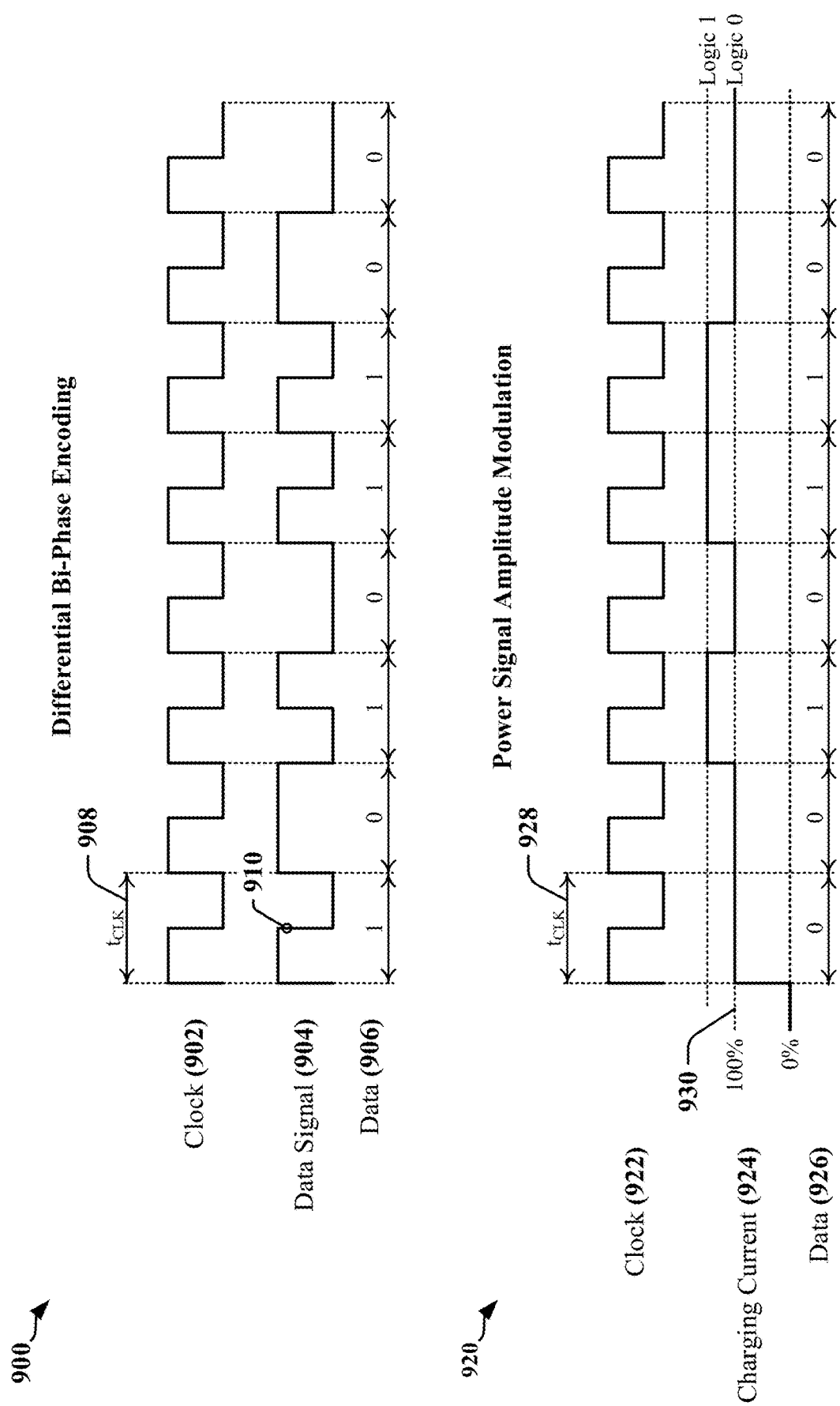
FIG. 9 illustrates examples of encoding schemes that may be adapted to digitally encode messages exchanged between power receivers and power transmitters in accordance with certain aspects disclosed herein.

FIG. 9 illustrates examples of encoding schemes 900, 920 that may be adapted to digitally encode messages exchanged between power receivers and power transmitters. In the first example, a differential bi-phase encoding scheme 900 encodes binary bits in the phase of a data signal 904. In the illustrated example, each bit of a data byte 906 is encoded in a corresponding cycle 908 of an encoder clock signal 902. The value of each bit is encoded in the presence or absence of a transition 910 (phase change) in the data signal 904 during the corresponding cycle 908.

In the second example, a tank voltage or charging current 924 is encoded using a power signal amplitude encoding scheme 920. In the illustrated example, binary bits of a data byte 926 are encoded in level of the charging current 924. Each bit of the data byte 926 is encoded in a corresponding cycle 928 of an encoder clock signal 922. The value of each bit is encoded in the voltage level of the charging current 924 relative to a nominal 100% voltage level 930 of the charging current 924 during the corresponding cycle 908.

ASK modulation by the receiver can be appreciated by referring again to FIG. 5. The charging current 518 provided to the resonant circuit 506 by the driver circuit 504 in the wireless transmitter 500 of FIG. 5 causes the inductor 514 to produce an electromagnetic flux that is coupled to the receiving coil in a receiving circuit provided in the chargeable device. The chargeable device can communicate information to the base station in the wireless charging device by modulating the charging current 518 and/or the voltage 516 measured at an LC node 510 in the resonant circuit 506. The receiving device can modulate the charging current 518 or the voltage 516 by changing the coupling between the transmitting coil in the resonant circuit 506 and the receiving coil in the receiving device in accordance with a pulse-width modulated signal, for example. The coupling may be changed by modifying the impedance presented by the receiving circuit in the chargeable device to the wireless transmitter 500.

The complexity of decoder systems used to demodulate and decode messages exchanged between power receivers and power transmitters can be complex and difficult to manage when multiple devices are communicating concurrently with a multi-device wireless charging system.

Figure 10:
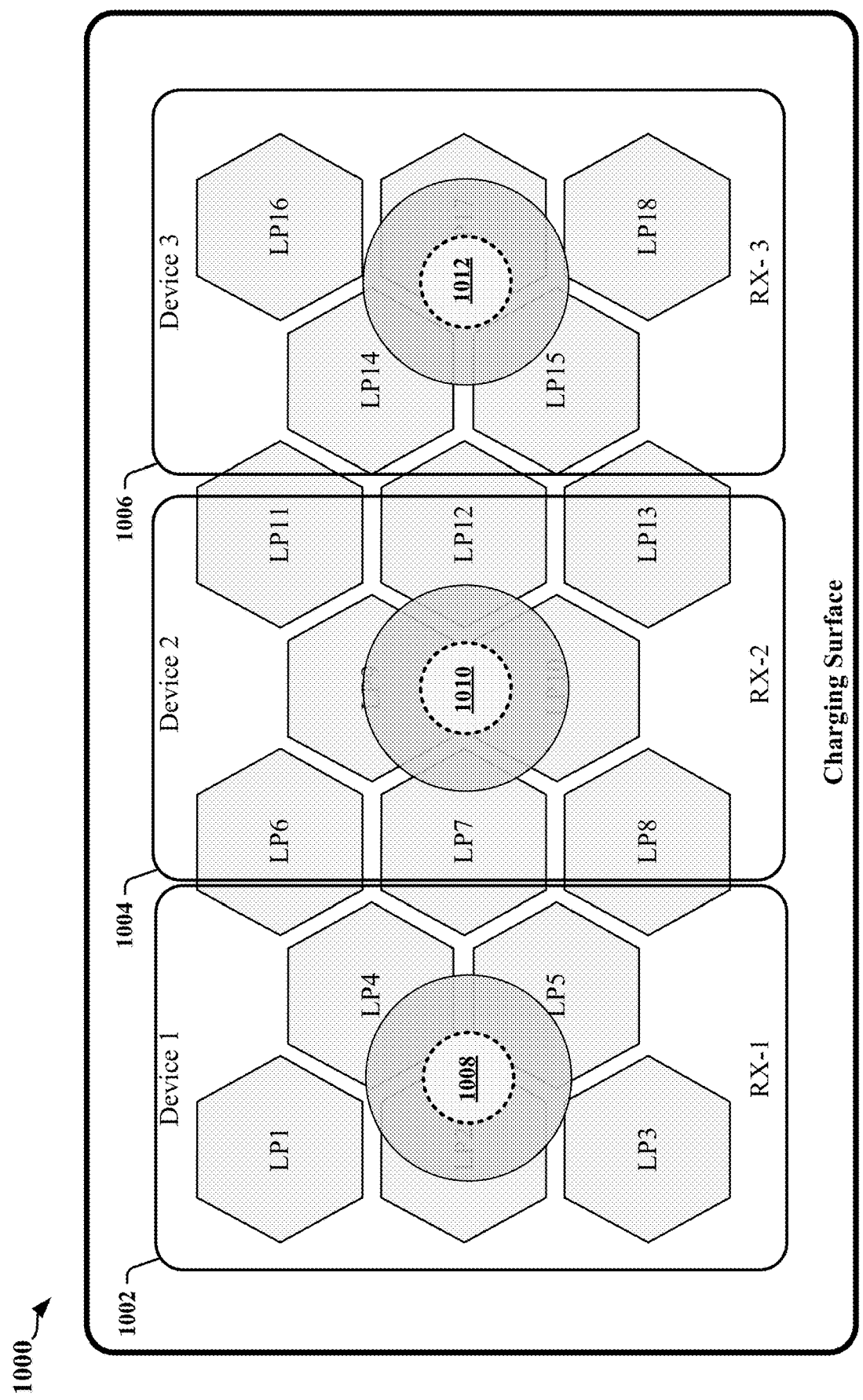
FIG. 10 illustrates a charging surface of a wireless charging device provided in accordance with certain aspects disclosed herein.

In a multi-coil, multi-device wireless charging system, multiple devices may be charged concurrently. FIG. 10 illustrates a charging surface 1000 of a wireless charging device upon which three receiving devices 1002, 1004, 1006 have been freely positioned. A device is freely positioned when it is placed on an unoccupied section of a charging surface 1000 without regard to alignment, orientation or position relative to an edge, etc. A wireless charging device can support free positioning when one or more transmitting coils in the charging surface 1000 can be configured to charge a receiving device 1002, 1004, 1006 regardless of physical location of the chargeable device. In the illustrated example, each receiving device 1002, 1004, 1006 has a single receiving coil 1008, 1010, 1012 that can be electromagnetically coupled with one or more transmitting coils (marked LP-1 through LP-18) in the charging surface 1000. In the illustrated example, the wireless charging device may include multiple drivers that can be configured to provide a charging current to one or more transmitting coils in a charging cell. The wireless charging device may additionally be capable of concurrent device discovery and/or concurrent control of the receiving coils 1008, 1010, 1012 in the three receiving devices 1002, 1004, 1006.

In a multi-coil, multi-device wireless charging system, multiple devices may be charged concurrently. Each device being charged may use ASK modulation of the charging current in a corresponding transmitting circuit to communicate power level requests and other information to the wireless transmitter 500 (see FIG. 5) through which the device is being charged. In some instances, ASK modulated signals transmitted to one wireless transmitter 500 may be detected by another wireless transmitter. For example, in a free-positioning wireless charging station, two devices 1002 and 1004 or 1004 and 1006 may be arbitrarily placed in close proximity to one another such that the transmitting coil (inductor 514) in one wireless transmitter 500 may be inductively coupled to different degrees with the receiving coils 1008, 1010, 1012 in both receiving devices 1002, 1004, 1006. Accordingly, a receiving device 1002, 1004, 1006 may effectively become a broadcaster when it sends ASK encoded information that can be decoded by multiple wireless transmitters 500. In some examples, a wireless transmitter 500 that is charging a first receiving device may be unable to decode an ASK message from the first receiving device when a second receiving device transmits an interfering ASK modulated signal. In some examples, a wireless transmitter 500 that is charging a first receiving device 1002, 1004, 1006 may receive and decode an ASK message from a second receiving device 1002, 1004, 1006 that includes a request for increased or decreased power transfer rate. The wireless transmitter 500 may modify its power output in response to the request from the second receiving device 1002, 1004, 1006 and thereby cause damage to the first receiving device 1002, 1004, 1006 when the first receiving device 1002, 1004, 1006 is incapable of handling increased power or may slow the charging rate of the first receiving device 1002, 1004, 1006 by reducing power transmission.

In accordance with certain aspects disclosed herein, a wireless charging system enables ASK modulated messages to be reliably transmitted between multiple pairs of power-receiving devices and corresponding wireless power transmitters without causing interference. The risk of messages being received and decoded at a wireless power transmitter other than the intended wireless power transmitter can be eliminated or reduced. In one aspect, different wireless power transmitters may be provided with charging currents that produce electromagnetic flux at different frequencies. The frequency of electromagnetic flux corresponds to the carrier frequency of the ASK modulated signal. The ASK demodulator in the transmitting circuit may include a band pass filter centered on the carrier frequency such that the band pass filter blocks carrier frequencies associated with other wireless power transmitters. Each receiving device 1002, 1004, 1006 may then have a private channel at the frequency at which its corresponding power transmitter operates.

In some implementations, a wireless charging device may be configured to detect and/or charge multiple receiving devices 1002, 1004, 1006 concurrently. When charging multiple receiving devices 1002, 1004, 1006 in a wireless charger that uses ASK load modulation for communicating from the receiver to the transmitter, large dynamic changes in the output power of one charging cell can result in disruption of the communication involving the other charging cells. Digital ping phase discovery may be particularly sensitive to such disruptions.

Figure 11:
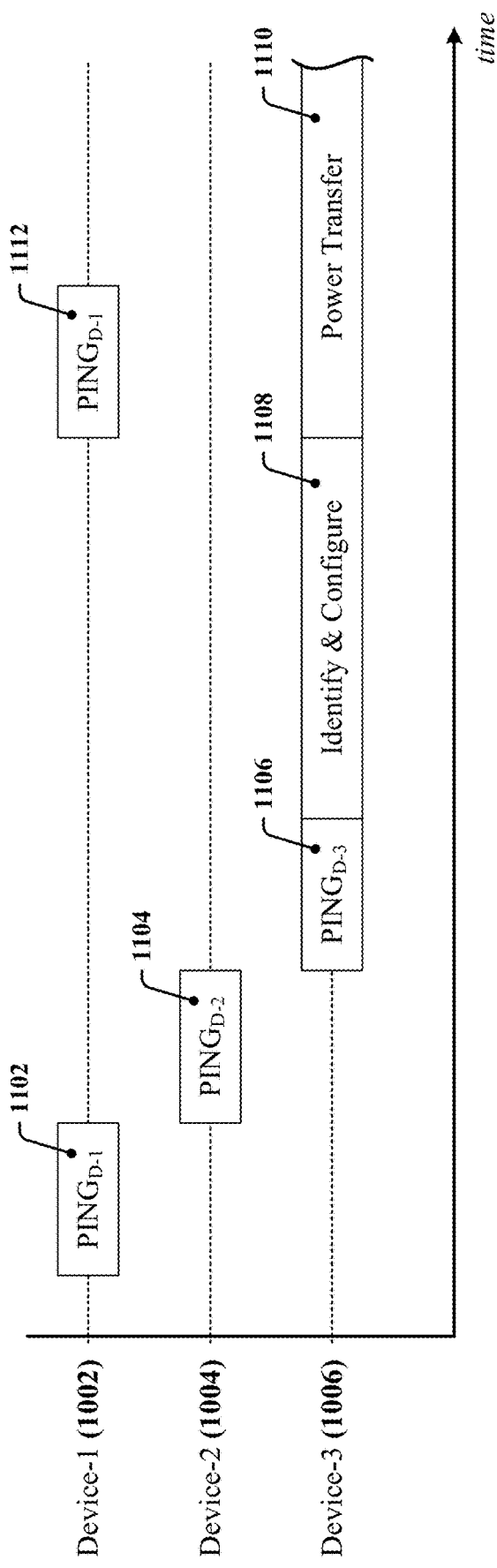
FIG. 11 illustrates an example of a scheduling scheme in which digital pings are sequenced in accordance with certain aspects disclosed herein.

According to certain aspects of this disclosure, disruptions and interferences during execution of digital pings can be limited by scheduling the pings issued to each receiving device 1002, 1004, 1006 or potential receiving device. FIG. 11 illustrates an example of a scheduling scheme 1100 in which digital pings are sequenced. Each charging cell scheduled within the sequence takes turns in transmitting a digital ping within its scheduled ping slot 1102, 1104, 1106, 1112. The response to pings may be decoded and processed during or after the scheduled ping slot 1102, 1104, 1106, 1112. In FIG. 11, a response to the third illustrated ping slot 1106 is processed in a quiet period that commences during the third illustrated ping slot 1106. The quiet period can be extended into a processing phase 1108 during which the responding receiving device 1006 may be identified and configured. During the extended quiet period, pinging is suppressed. The timing provided by the scheduling scheme 1100 ensures that no large changes in dynamic range occurs when a device is initially pinged. After the channel reaches the power transfer state 1110, pinging can be resumed. The scheduling scheme 1100 can enhance the probability of a successful digital ping phase and processing during which message retries are not possible.

Multiple data streams may be provided to enable exchange of data between multiple devices and a multi-device wireless charger. These data streams may support communication from a power receiver (PRx) to a power transmitter (PTx), where data encoded using ASK load modulation is carried in the same magnetics domain. Conventional systems typically do not provide for coexistence management and collisions may occur between the data streams when multiple messages are being transmitted at the same time in the same magnetics domain.

According to certain aspects of this disclosure, each power receiver may communicate with its corresponding power transmitter over a private channel when different carrier frequencies are assigned to different PTx/PRx pairs. In one example, the wireless power transmitters may transmit power at selected carrier frequencies in the 100 kHz to 210 kHz frequency range and data may be modulated using a baseband differential signaling clock of 4 kHz. The frequencies assigned for each channel may be selected to provide a guard band between each channel that is sufficient to prevent interference.

Figure 12:
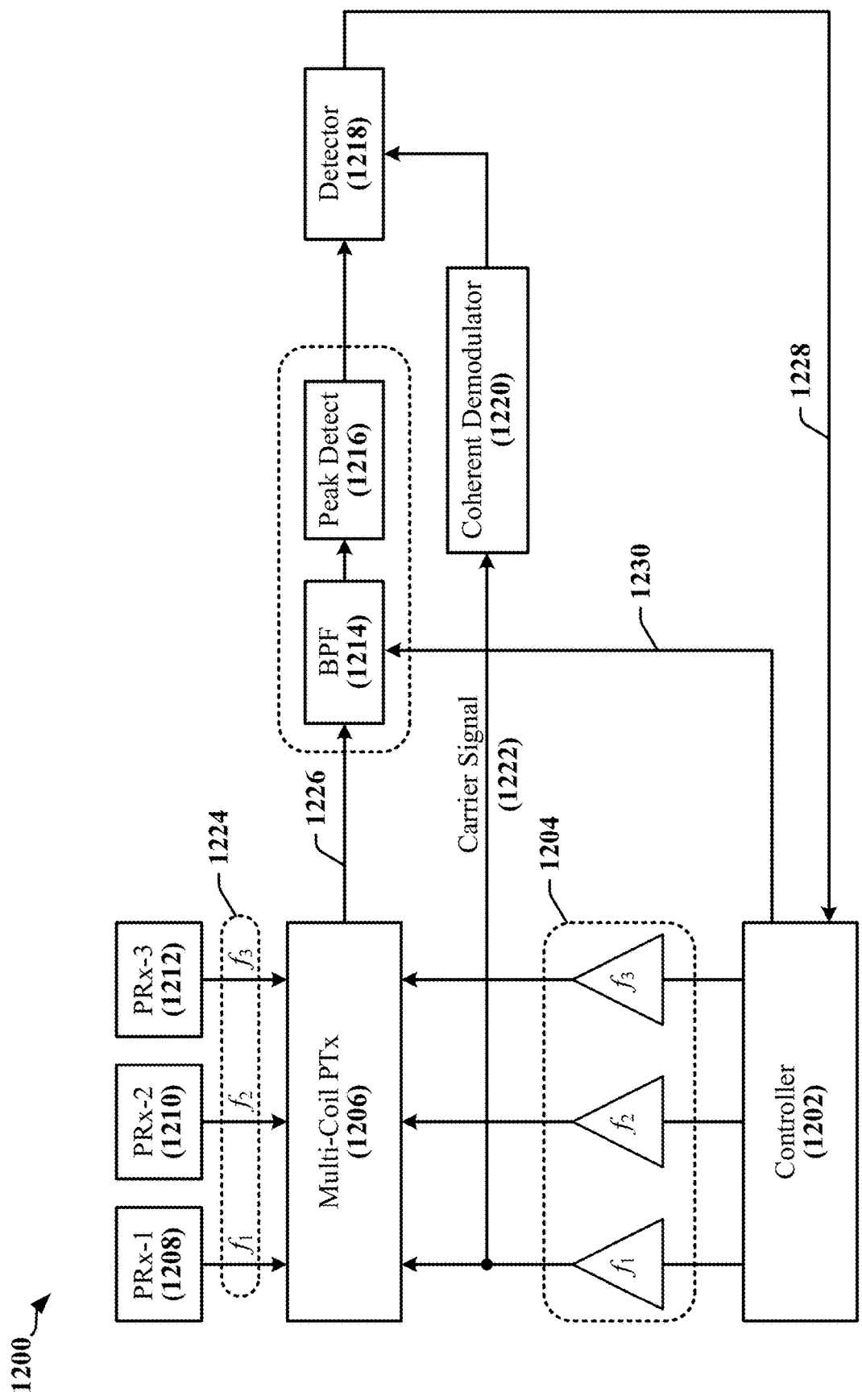
FIG. 12 illustrates an example of a communication interface that supports multi-frequency ASK modulation in accordance with certain aspects disclosed herein.

FIG. 12 illustrates an example of a communication interface 1200 that supports multi-frequency ASK modulation. Certain wireless charging protocols permit the power transmitter to select the operating frequency used for power transfer. The operating frequency may be the nominal frequency selected for the charging current. The operating frequency also serves as the carrier frequency for ASK modulation. According to certain aspects disclosed herein, the power transmitter can select and assign a unique operating frequency for each power receiver coupled to multi-device wireless charger. The ASK-modulated channel used by the power receiver can be tuned to the operating frequency.

Figure 13:
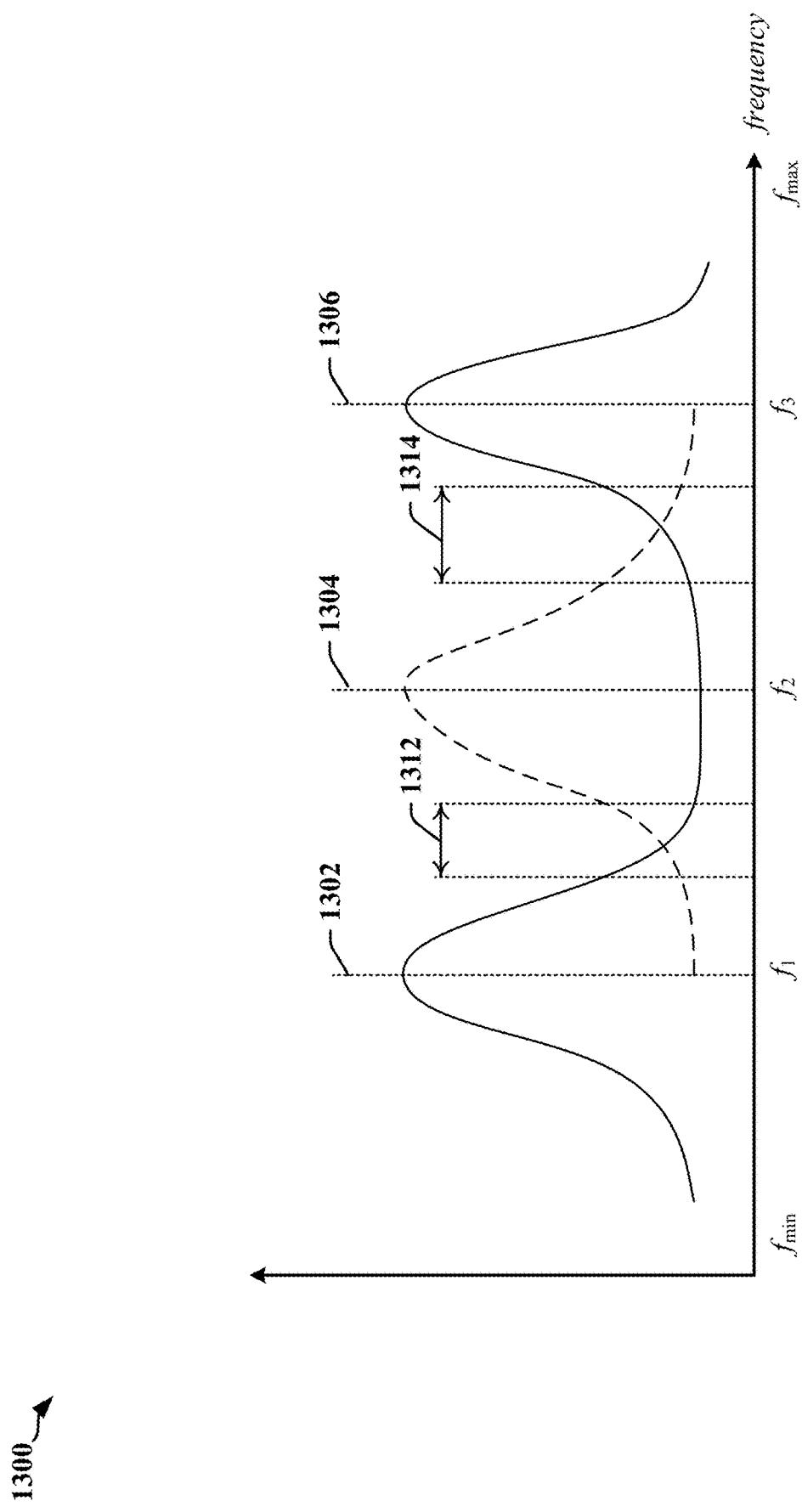
FIG. 13 illustrates an example of frequency spectrum corresponding to the multi-frequency ASK modulation scheme illustrated in FIG. 13.

In the illustrated communication interface 1200, a multi-device wireless charger has a multi-coil power transmitting circuit 1206 that is controlled by a processor, sequencer, state machine or other controller 1202. The controller 1202 may configure a set of drivers 1204 to provide a charging current to each active charging coil in the power transmitting circuit 1206. Each active charging coil may be coupled to a different receiving device 1208, 1210, 1212. In some instances, a charging current may be provided to multiple coils that are electromagnetically coupled to one or more receiving coils in a single receiving device. The controller 1202 may configure the set of drivers 1204 to provide charging currents at different frequencies. In the illustrated example, the set of drivers 1204 provides charging currents at carrier frequencies 1302, 1304, 1306 that are defined in the set of frequencies $\{f_1, f_2, f_3, \ldots f_n\}$ configured for the use of the set of drivers 1204. FIG. 13 illustrates an example of the frequency spectrum 1300 configured for a wireless charger. Guard bands 1312, 1314 may be provided between channels to ensure adequate separation of the carrier frequencies 1302, 1304, 1306. The wireless charging device may communicate with the receiving devices 1208, 1210, 1212 using ASK-modulated channels on carrier signals 1224 defined by the frequencies used for transferring power to the corresponding receiving devices 1208, 1210, 1212.

In the example illustrated in FIG. 12, an ASK-modulated signal 1226 is provided to a band-pass filter 1214 that is configured by a band-select signal 1230 provided by the controller 1202. The band-select signal 1230 may configure the band-pass filter 1214 to block frequency components that are not associated with the channel provided for a first receiving device 1208. In some implementations the band-select signal 1230 defines the center frequency and bandwidth of the band-pass filter 1214. A filtered version of the ASK-modulated signal 1226 is provided to a peak detector 1216 that feeds a detector 1218. The detector 1218 also receives the output of a coherent demodulator 1220. The coherent demodulator 1220 may be configured to recover phase modulation the carrier signal 1222 to enable decoding of information 1228 carried in the ASK-modulated signal 1226. The band-pass filter 1214 isolates the contribution of the first receiving device 1208 to the ASK-modulated signal 1226 from ASK-modulated signaling received from the other receiving devices 1210, 1212.

The separation of ASK-modulated signaling enables each receiving device 1208, 1210, 1212 to transmit data without concern for collisions with ASK-modulated signaling transmitted by the other devices. In certain implementations, each channel may be decoded using an asynchronous demodulator with a tunable band-pass filter. In certain implementations, each channel may be decoded using a coherent/synchronous demodulator. It is contemplated that other types of demodulator will be employed in some implementations.

Figure 14:
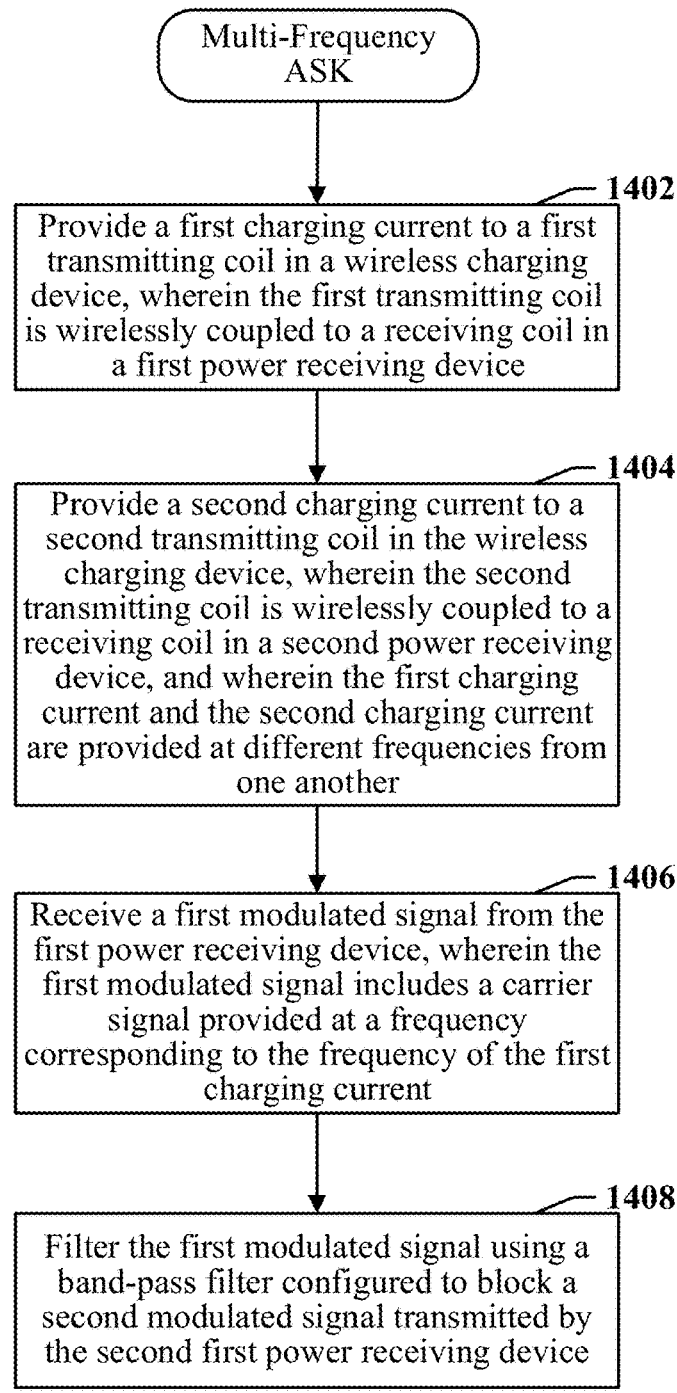
FIG. 14 is a first flowchart illustrating an example of ASK modulation in a wireless charging device provided in accordance with certain aspects disclosed herein.

FIG. 14 is flowchart 1400 illustrating an example of a method for communicating with a device being charged. The method may be performed by a controller in a multi-device wireless charger. At block 1402, the controller may provide a first charging current to a first transmitting coil in a wireless charging device. The first transmitting coil may be wirelessly coupled to a receiving coil in a first power receiving device. At block 1404, the controller may provide a second charging current to a second transmitting coil in the wireless charging device. The second transmitting coil may be wirelessly coupled to a receiving coil in a second power receiving device. The first charging current and the second charging current may be provided at different frequencies from one another. At block 1406, the controller may receive a first modulated signal from the first power receiving device. The first modulated signal may include a carrier signal provided at a frequency corresponding to the frequency of the first charging current. At block 1408, the controller may filter the first modulated signal using a band-pass filter configured to block a second modulated signal transmitted by the second power receiving device.

In various implementations, the controller may decode a message from an output of the band-pass filter, the message originating at the first power receiving device. Decoding the message may include providing the output of the band-pass filter to an asynchronous demodulator. to decode the message. Decoding the message may include demodulating the message using a detector. Decoding the message may include providing the output of the band-pass filter to a synchronous demodulator. In one example, the first modulated signal is ASK modulated.

Figure 15:
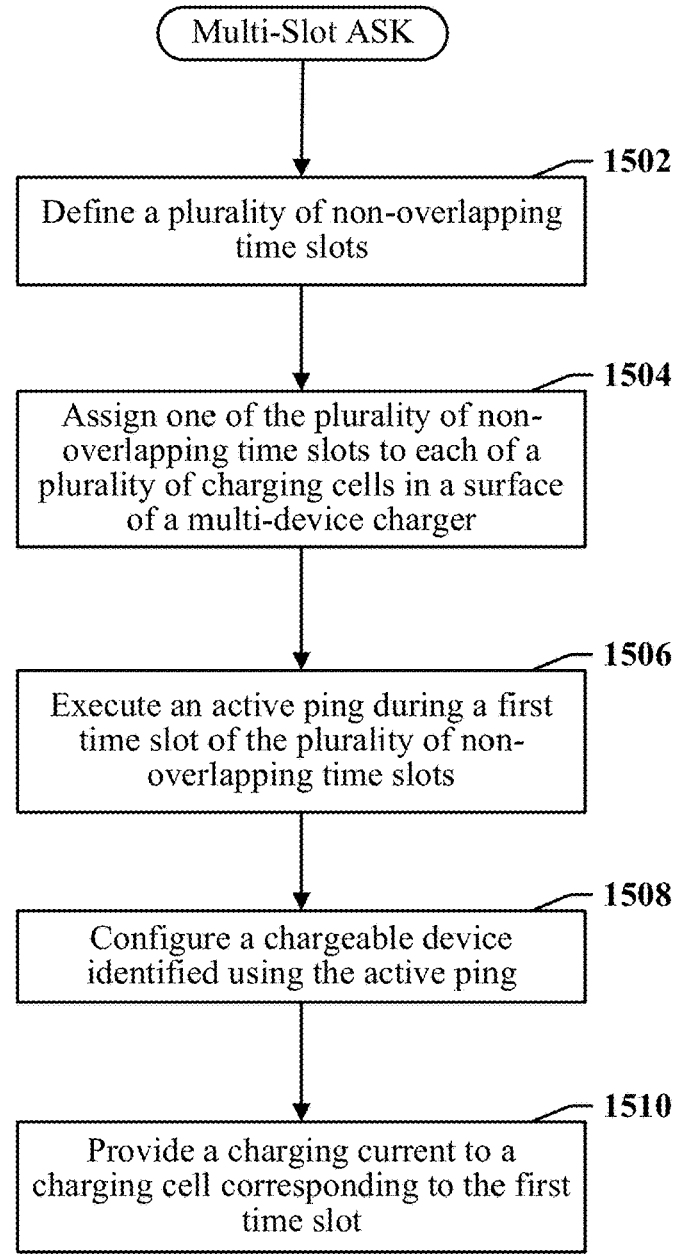
FIG. 15 is a second flowchart illustrating an example of ASK modulation in a wireless charging device provided in accordance with certain aspects disclosed herein.

FIG. 15 is flowchart 1500 illustrating an example of a method for communicating with a device being charged. The method may be performed by a controller in a multi-device wireless charger. At block 1502, the controller may define a plurality of non-overlapping time slots. At block 1504, the controller may assign one of the plurality of non-overlapping time slots to each of a plurality of charging cells at or in a surface of the wireless charging device. At block 1506, the controller may execute an active ping during a first time slot of the plurality of non-overlapping time slots. At block 1508, configuring a chargeable device identified using the active ping. At block 1510, the controller may provide a charging current to a charging cell corresponding to the first time slot.

Example of a Processing Circuit

Figure 16:
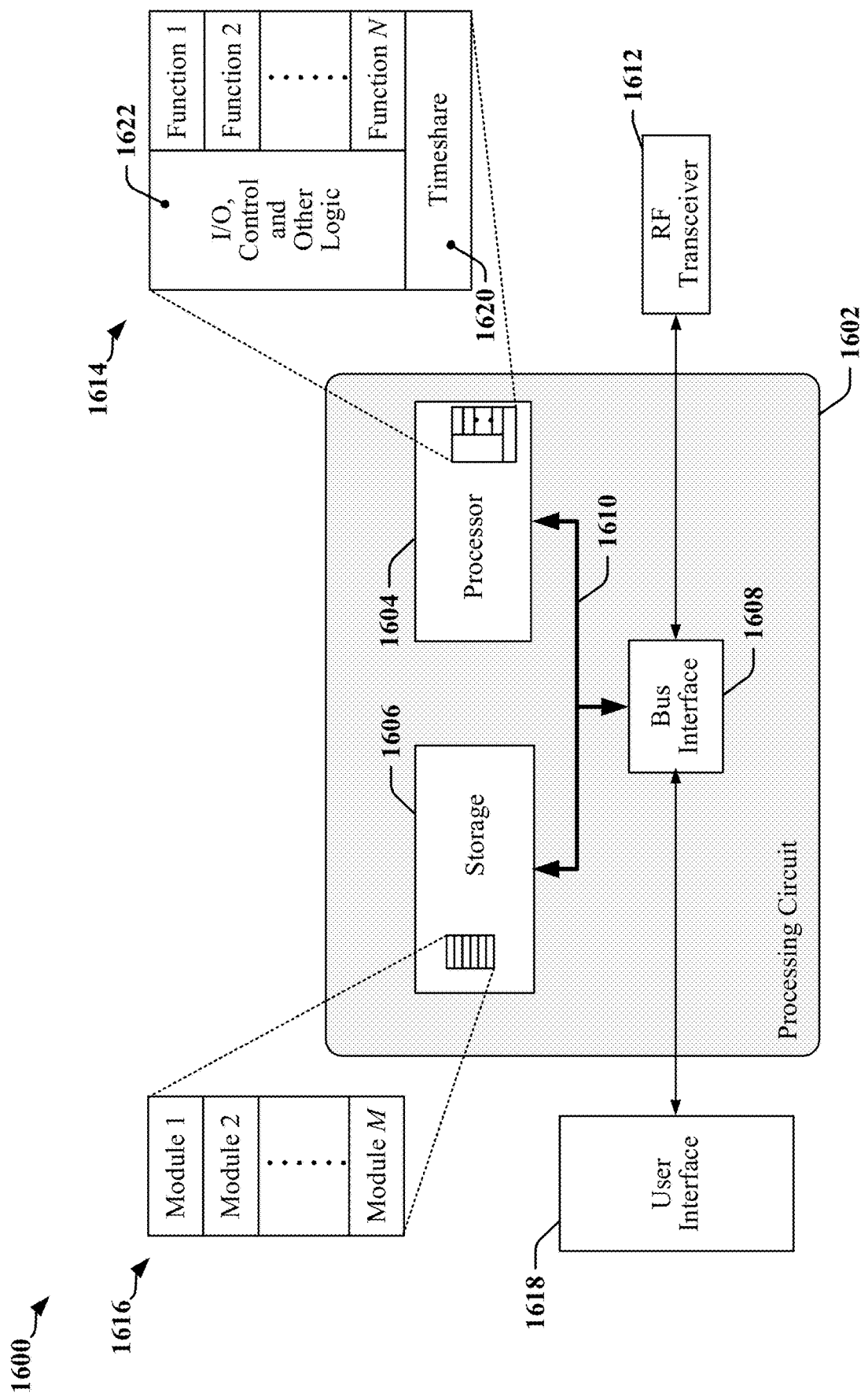
FIG. 16 illustrates one example of an apparatus employing a processing circuit that may be adapted according to certain aspects disclosed herein.

FIG. 16 illustrates an example of a hardware implementation for an apparatus 1600 that may be incorporated in a wireless charging device or in a receiving device that enables a battery to be wirelessly charged. In some examples, the apparatus 1600 may perform one or more functions disclosed herein. In accordance with various aspects of the disclosure, an element, or any portion of an element, or any combination of elements as disclosed herein may be implemented using a processing circuit 1602. The processing circuit 1602 may include one or more processors 1604 that are controlled by some combination of hardware and software modules. Examples of processors 1604 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1604 may include specialized processors that perform specific functions, and that may be configured, augmented or controlled by one of the software modules 1616. The one or more processors 1604 may be configured through a combination of software modules 1616 loaded during initialization, and further configured by loading or unloading one or more software modules 1616 during operation.

In the illustrated example, the processing circuit 1602 may be implemented with a bus architecture, represented generally by the bus 1610. The bus 1610 may include any number of interconnecting buses and bridges depending on the specific application of the processing circuit 1602 and the overall design constraints. The bus 1610 links together various circuits including the one or more processors 1604, and storage 1606. Storage 1606 may include memory devices and mass storage devices, and may be referred to herein as computer-readable media and/or processor-readable media. The storage 1606 may include transitory storage media and/or non-transitory storage media.

The bus 1610 may also link various other circuits such as timing sources, timers, peripherals, voltage regulators, and power management circuits. A bus interface 1608 may provide an interface between the bus 1610 and one or more transceivers 1612. In one example, a transceiver 1612 may be provided to enable the apparatus 1600 to communicate with a charging or receiving device in accordance with a standards-defined protocol. Depending upon the nature of the apparatus 1600, a user interface 1618 (e.g., keypad, display, speaker, microphone, joystick) may also be provided, and may be communicatively coupled to the bus 1610 directly or through the bus interface 1608.

A processor 1604 may be responsible for managing the bus 1610 and for general processing that may include the execution of software stored in a computer-readable medium that may include the storage 1606. In this respect, the processing circuit 1602, including the processor 1604, may be used to implement any of the methods, functions and techniques disclosed herein. The storage 1606 may be used for storing data that is manipulated by the processor 1604 when executing software, and the software may be configured to implement any one of the methods disclosed herein.

One or more processors 1604 in the processing circuit 1602 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1606 or in an external computer-readable medium. The external computer-readable medium and/or storage 1606 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1606 may also include, by way of example, a carrier wave, a transmission line, and any other suitable medium for transmitting software and/or instructions that may be accessed and read by a computer. Computer-readable medium and/or the storage 1606 may reside in the processing circuit 1602, in the processor 1604, external to the processing circuit 1602, or be distributed across multiple entities including the processing circuit 1602. The computer-readable medium and/or storage 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1606 may maintain and/or organize software in loadable code segments, modules, applications, programs, etc., which may be referred to herein as software modules 1616. Each of the software modules 1616 may include instructions and data that, when installed or loaded on the processing circuit 1602 and executed by the one or more processors 1604, contribute to a run-time image 1614 that controls the operation of the one or more processors 1604.

When executed, certain instructions may cause the processing circuit 1602 to perform functions in accordance with certain methods, algorithms and processes described herein.

Some of the software modules 1616 may be loaded during initialization of the processing circuit 1602, and these software modules 1616 may configure the processing circuit 1602 to enable performance of the various functions disclosed herein. For example, some software modules 1616 may configure internal devices and/or logic circuits 1622 of the processor 1604, and may manage access to external devices such as a transceiver 1612, the bus interface 1608, the user interface 1618, timers, mathematical coprocessors, and so on. The software modules 1616 may include a control program and/or an operating system that interacts with interrupt handlers and device drivers, and that controls access to various resources provided by the processing circuit 1602. The resources may include memory, processing time, access to a transceiver 1612, the user interface 1618, and so on.

One or more processors 1604 of the processing circuit 1602 may be multifunctional, whereby some of the software modules 1616 are loaded and configured to perform different functions or different instances of the same function. The one or more processors 1604 may additionally be adapted to manage background tasks initiated in response to inputs from the user interface 1618, the transceiver 1612, and device drivers, for example. To support the performance of multiple functions, the one or more processors 1604 may be configured to provide a multitasking environment, whereby each of a plurality of functions is implemented as a set of tasks serviced by the one or more processors 1604 as needed or desired. In one example, the multitasking environment may be implemented using a timesharing program 1620 that passes control of a processor 1604 between different tasks, whereby each task returns control of the one or more processors 1604 to the timesharing program 1620 upon completion of any outstanding operations and/or in response to an input such as an interrupt. When a task has control of the one or more processors 1604, the processing circuit is effectively specialized for the purposes addressed by the function associated with the controlling task. The timesharing program 1620 may include an operating system, a main loop that transfers control on a round-robin basis, a function that allocates control of the one or more processors 1604 in accordance with a prioritization of the functions, and/or an interrupt driven main loop that responds to external events by providing control of the one or more processors 1604 to a handling function.

In one example, the apparatus 1600 includes or operates as a wireless charging apparatus that has a battery charging power source coupled to a charging circuit, a plurality of charging cells and a controller, which may be included in one or more processors 1604. The plurality of charging cells may be configured to provide a charging surface. At least one coil may be configured to direct an electromagnetic field through a charge transfer area of each charging cell.

The controller may be configured to provide a first charging current to a first transmitting coil in a wireless charging device, provide a second charging current to a second transmitting coil in the wireless charging device, receive a first modulated signal from the first power receiving device, filter the first modulated signal using a band-pass filter configured to block a second modulated signal transmitted by the second power receiving device. The first transmitting coil may be coupled to a receiving coil in a first power receiving device and the second transmitting coil may be coupled to a receiving coil in a second power receiving device. The first charging current and the second charging current may be provided at different frequencies from one another. The first modulated signal may include a carrier signal provided at a frequency corresponding to the frequency of the first charging current.

In some implementations, the controller is configured to decode a message from an output of the band-pass filter, the message originating at the first power receiving device. The controller may be configured to provide the output of the band-pass filter to an asynchronous demodulator. to decode the message. The controller may be configured to demodulate the message using a detector. The controller may be configured to provide the output of the band-pass filter to a synchronous demodulator. In some instances, the first modulated signal is ASK modulated.

In another example, the apparatus 1600 includes or operates as a wireless charging apparatus that has a battery charging power source coupled to a charging circuit, a plurality of charging cells and a controller, which may be included in one or more processors 1604. The plurality of charging cells may be configured to provide a charging surface. At least one coil may be configured to direct an electromagnetic field through a charge transfer area of each charging cell.

The controller may be configured to define a plurality of non-overlapping time slots, assign one of the plurality of non-overlapping time slots to each of a plurality of charging cells at or in a surface of a wireless charging device, execute an active ping during a first time slot of the plurality of non-overlapping time slots, configure a chargeable device identified using the active ping, and provide a charging current to a charging cell corresponding to the first time slot.

In another example, the storage 1606 maintains instructions and information where the instructions are configured to cause the one or more processors 1604 to: provide a first charging current to a first transmitting coil in the wireless charging device, where the first transmitting coil is coupled to a receiving coil in a first power receiving device; provide a second charging current to a second transmitting coil in the wireless charging device, where the second transmitting coil is coupled to a receiving coil in a second power receiving device, and where the first charging current and the second charging current are provided at different frequencies from one another; receive a first modulated signal from the first power receiving device, where the first modulated signal includes a carrier signal provided at a frequency corresponding to the frequency of the first charging current; and filter the first modulated signal using a band-pass filter configured to block a second modulated signal transmitted by the second power receiving device.

In some instances, the instructions may be configured to cause the one or more processors 1604 to decode a message from an output of the band-pass filter, the message originating at the first power receiving device. Decoding the message may include providing the output of the band-pass filter to an asynchronous demodulator. to decode the message. Decoding the message may include demodulating the message using a detector. Decoding the message may include providing the output of the band-pass filter to a synchronous demodulator. The first modulated signal may be ASK modulated.

In another example, the storage 1606 maintains instructions and information where the instructions are configured to cause the one or more processors 1604 to define a plurality of non-overlapping time slots, assign one of the plurality of non-overlapping time slots to each of a plurality of charging cells at or in a surface of a wireless charging device, execute an active ping during a first time slot of the plurality of non-overlapping time slots, configure a chargeable device identified using the active ping, and provide a charging current to a charging cell corresponding to the first time slot.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for communicating with a device being charged, comprising:
   providing a first charging current to a first transmitting coil in a wireless charging device, wherein the first transmitting coil is wirelessly coupled to a receiving coil in a first power receiving device;
   providing a second charging current to a second transmitting coil in the wireless charging device, wherein the second transmitting coil is wirelessly coupled to a receiving coil in a second power receiving device, and wherein the first charging current and the second charging current are provided at different frequencies from one another;
   receiving a first modulated signal from the first power receiving device while providing the first charging current to the first transmitting coil, wherein the first modulated signal includes a carrier signal provided at a frequency corresponding to the frequency of the first charging current; and
   filtering the first modulated signal using a band-pass filter configured to block a second modulated signal that is transmitted by the second power receiving device while the first charging current is provided to the first transmitting coil and the second charging current is provided to the first transmitting coil.

2. The method of claim 1, further comprising:
   decoding a message from an output of the band-pass filter, the message originating at the first power receiving device.

3. The method of claim 2, wherein decoding the message includes:
   providing the output of the band-pass filter to an asynchronous demodulator to decode the message.

4. The method of claim 2, wherein decoding the message includes:
   demodulating the message using a detector.

5. The method of claim 2, wherein decoding the message includes:
   providing the output of the band-pass filter to a synchronous demodulator.

6. The method of claim 1, wherein the first modulated signal is Amplitude Shift Key (ASK) modulated.

7. A method for communicating with a device being charged, comprising:
   providing a first charging current to a first transmitting coil in a wireless charging device, wherein the first transmitting coil is wirelessly coupled to a receiving coil in a first power receiving device;
   providing a second charging current to a second transmitting coil in the wireless charging device, wherein the second transmitting coil is wirelessly coupled to a receiving coil in a second power receiving device, and wherein the first charging current and the second charging current are provided at different frequencies from one another;
   receiving a first modulated signal from the first power receiving device, wherein the first modulated signal includes a carrier signal provided at a frequency corresponding to the frequency of the first charging current;
   filtering the first modulated signal using a band-pass filter configured to block a second modulated signal transmitted by the second power receiving device;
   defining a plurality of non-overlapping time slots;
   assigning one of the plurality of non-overlapping time slots to each of a plurality of charging cells at a surface of the wireless charging device;
   executing an active ping during a first time slot of the plurality of non-overlapping time slots;
   configuring a chargeable device identified using the active ping; and
   providing a third charging current to a charging cell that is assigned the first time slot.

8. A wireless charging device, comprising:
   a plurality of charging cells provided on a surface of the wireless charging device; and
   a controller configured to:
      provide a first charging current to a first transmitting coil in the wireless charging device, wherein the first transmitting coil is wirelessly coupled to a receiving coil in a first power receiving device;
      provide a second charging current to a second transmitting coil in the wireless charging device, wherein the second transmitting coil is wirelessly coupled to a receiving coil in a second power receiving device, and wherein the first charging current and the second charging current are provided at different frequencies from one another;
      receive a first modulated signal from the first power receiving device while providing the first charging current to the first transmitting coil, wherein the first modulated signal includes a carrier signal provided at a frequency corresponding to the frequency of the first charging current; and
      filter the first modulated signal using a band-pass filter configured to block a second modulated signal transmitted by the second power receiving signal that is transmitted by the second power receiving device while the first charging current is provided to the first transmitting coil and the second charging current is provided to the first transmitting coil.

9. The wireless charging device of claim 8, wherein the controller configured to:

decode a message from an output of the band-pass filter, the message originating at the first power receiving device.

10. The wireless charging device of claim 9, wherein the controller configured to:
provide the output of the band-pass filter to an asynchronous demodulator to decode the message.

11. The wireless charging device of claim 9, wherein the controller configured to:
demodulate the message using a detector.

12. The wireless charging device of claim 9, wherein the controller configured to:
provide the output of the band-pass filter to a synchronous demodulator.

13. The wireless charging device of claim 8, wherein the first modulated signal is Amplitude Shift Key (ASK) modulated.

14. A wireless charging device, comprising:
a plurality of charging cells provided on a surface of the wireless charging device; and
a controller configured to:
provide a first charging current to a first transmitting coil in the wireless charging device, wherein the first transmitting coil is wirelessly coupled to a receiving coil in a first power receiving device;
provide a second charging current to a second transmitting coil in the wireless charging device, wherein the second transmitting coil is wirelessly coupled to a receiving coil in a second power receiving device, and wherein the first charging current and the second charging current are provided at different frequencies from one another;
receive a first modulated signal from the first power receiving device, wherein the first modulated signal includes a carrier signal provided at a frequency corresponding to the frequency of the first charging current filter the first modulated signal using a band-pass filter configured to block a second modulated signal transmitted by the second power receiving device;
define a plurality of non-overlapping time slots;
assign one of the plurality of non-overlapping time slots to each of a plurality of charging cells at a surface of the wireless charging device;
execute an active ping during a first time slot of the plurality of non-overlapping time slots;
configure a chargeable device identified using the active ping; and
provide a charging current to a charging cell corresponding to the first time slot.

15. A processor readable storage medium, comprising code for:
providing a first charging current to a first transmitting coil in a wireless charging device, wherein the first transmitting coil is wirelessly coupled to a receiving coil in a first power receiving device;
providing a second charging current to a second transmitting coil in the wireless charging device, wherein the second transmitting coil is wirelessly coupled to a receiving coil in a second power receiving device, and wherein the first charging current and the second charging current are provided at different frequencies from one another;
receiving a first modulated signal from the first power receiving device while providing the first charging current to the first transmitting coil, wherein the first modulated signal includes a carrier signal provided at a frequency corresponding to the frequency of the first charging current; and
filtering the first modulated signal using a band-pass filter configured to block a second modulated signal that is transmitted by the second power receiving device while the first charging current is provided to the first transmitting coil and the second charging current is provided to the first transmitting coil.

16. The storage medium of claim 15, further comprising code for:
decoding a message from an output of the band-pass filter, the message originating at the first power receiving device.

17. The storage medium of claim 16, further comprising code for:
providing the output of the band-pass filter to an asynchronous demodulator to decode the message, wherein the first modulated signal is Amplitude Shift Key (ASK) modulated.

18. The storage medium of claim 16, further comprising code for:
demodulating the message using a detector.

19. The storage medium of claim 16, further comprising code for:
providing the output of the band-pass filter to a synchronous demodulator.

20. A processor readable storage medium, comprising code for:
providing a first charging current to a first transmitting coil in a wireless charging device, wherein the first transmitting coil is wirelessly coupled to a receiving coil in a first power receiving device;
providing a second charging current to a second transmitting coil in the wireless charging device, wherein the second transmitting coil is wirelessly coupled to a receiving coil in a second power receiving device, and wherein the first charging current and the second charging current are provided at different frequencies from one another;
receiving a first modulated signal from the first power receiving device, wherein the first modulated signal includes a carrier signal provided at a frequency corresponding to the frequency of the first charging current;
filtering the first modulated signal using a band-pass filter configured to block a second modulated signal transmitted by the second power receiving device;
defining a plurality of non-overlapping time slots;
assigning one of the plurality of non-overlapping time slots to each of a plurality of charging cells at a surface of the wireless charging device;
executing an active ping during a first time slot of the plurality of non-overlapping time slots;
configuring a chargeable device identified using the active ping; and
providing a third charging current to a charging cell that is assigned the first time slot.

* * * * *